United States Patent [19]
Linn

[11] 4,202,719
[45] May 13, 1980

[54] SINGLE FACER DRIVE

[75] Inventor: S. Stephen Linn, Marlton, N.J.

[73] Assignee: Molins Machine Company, Inc., Cherry Hill, N.J.

[21] Appl. No.: 894,793

[22] Filed: Apr. 10, 1978

[51] Int. Cl.[2] .......... B31F 1/28; B32B 31/12; B65H 17/12; B31F 1/26

[52] U.S. Cl. .......... 156/205; 156/210; 156/292; 156/462; 156/470; 156/471; 198/624; 198/788; 198/789; 226/53; 226/181; 226/188; 226/190; 425/336; 425/369; 425/168

[58] Field of Search .......... 156/205, 210, 292, 470, 156/471, 462; 172/537; 198/624, 780, 788, 789, 832; 226/53, 181, 184, 188, 190; 271/7, 80; 425/336, 369

[56] References Cited

U.S. PATENT DOCUMENTS

| | | | |
|---|---|---|---|
| 1,810,930 | 6/1931 | Sieg | 156/495 X |
| 1,898,551 | 2/1933 | MacCutcheon | 198/788 |
| 2,173,852 | 9/1939 | Miller | 156/471 |
| 2,576,281 | 11/1951 | Carr | 156/555 X |
| 2,843,254 | 7/1958 | Vaughan | 198/624 X |
| 3,053,309 | 9/1962 | Wilson et al. | 156/471 |
| 3,068,918 | 12/1962 | Smith | 198/624 X |
| 3,077,000 | 2/1963 | Huisman et al. | 156/205 X |
| 3,157,551 | 11/1964 | Granozio | 156/471 |
| 3,256,566 | 6/1966 | Campbell | 425/336 |
| 3,479,240 | 11/1969 | Moser | 156/205 |
| 3,776,029 | 12/1973 | McKee | 156/462 X |
| 3,827,395 | 8/1974 | Goettsch | 118/5 |
| 3,871,809 | 3/1975 | Williams | 425/336 X |
| 3,892,613 | 7/1975 | McDonald et al. | 156/205 X |
| 4,033,496 | 7/1977 | Rolfe | 226/188 |

*Primary Examiner*—John T. Goolkasian
*Assistant Examiner*—Robert A. Dawson
*Attorney, Agent, or Firm*—Seidel, Gonda, Goldhammer & Panitch

[57] ABSTRACT

Each corrugating roll on a single facer machine is separately driven at substantially the same speed without the corrugating rolls being geared directly together and without transmitting driving torque through mating flutes on the rolls whereby the rolls may corrugate a web passing therebetween with minimal tension of the web.

9 Claims, 3 Drawing Figures

SINGLE FACER DRIVE

BACKGROUND

A corrugating medium is fluted by passing a web of such medium between heated, fluted rolls and applying high pressure to deform the web. An adhesive, preferably a semi-gelled starch mixture, is then applied to the crests of the corrugated medium. A smooth web of a linerboard is pressed against the glued crests by a heated pressure roll to form single face corrugated paperboard. Conventionally, both webs have been subjected to successive heating and preconditioning to render the material malleable and to set the adhesive during the instant when the pressure roll, the liner and the glued crests of the medium are juxtaposed.

The corrugating rolls are provided with longitudinal flutes which act as dies to corrugate the medium and constitute the means by which one corrugating roll drives the other corrugating roll. It is conventional to drive the lower corrugating roll by a motor and a right angle speed reducer as exemplified by the last two mentioned patents.

The corrugating process or the tucking of the web medium into the flutes of the corrugating rolls exert intermittent and erratic tensile stresses on the medium. This causes many mediums to be strained beyond their elastic limit, particularly at high operating speeds. Accordingly, means have long been sought to attentuate and/or equilize the tensile stresses on the medium. One early attempt to control this problem is described in U.S. Pat. No. 1,810,930. The last-mentioned patent provided a feeding means to feed the medium under slight but constant tension. Another attempt is disclosed in U.S. Pat. No. 3,479,240 which employs a capstan to provide a slight overfeeding of the medium. Neither of these feeding systems was particularly successful because the tensions on the medium were induced by the labyrinth of the meshing flutes beyond the range of an exteriorly mounted tension controlling device.

Many years ago, it was conventional to drive one corrugating roll of a single facer machine and gear the shafts for the corrugating rolls directly together so that they remain in mesh and rotated in opposite directions to corrugate a web passing therebetween. An example of such apparatus is shown in U.S. Pat. No. 2,576,281.

The flutes on a corrugating roll of a single facer machine are not involute and tend to rotate at non-uniform velocity. The teeth on meshing gears are involute and rotate with uniform velocity. Hence, driving both corrugating rolls with directly meshed gears results in erratic stresses being set up in the teeth of the gears and in the flutes of the corrugating rolls whereby commercially acceptable boards cannot be produced. Such problems do not exist when one corrugating roll is driven directly by a motor and said one roll drives the second corrugating roll through the mesh of the flutes. Structure of this type has been conventional in recent years. For an example of the last-mentioned apparatus, see U.S. Pat. Nos. 3,053,309 and 3,776,029. However, when this is accomplished, substantial tension is applied to the web being corrugated.

Some inexpensive web materials cannot be corrugated due to the amount of tension applied by the flutes of the corrugating rolls. In the so-called cold corrugating system, wherein the rolls are at room temperature, it is necessary to apply some type of lubricating medium such as wax to the medium before it is corrugated.

SUMMARY OF THE INVENTION

The present invention is directed to a single facer machine having two corrugating rolls in mesh. The improvement comprises a motor means independently connected to each roll for separately driving each roll in opposite directions at substantially the same speed and without directly gearing said rolls together so that said rolls may corrugate a web passing therebetween with minimal tension on the web.

I have discovered that by driving the upper corrugating roll separately from the lower corrugating roll I may corrugate mediums at normal operating speeds which previously could not be corrugated except at extremely low speeds or not at all. A beneficial aspect of the invention is that the medium in the so-called cold corrugator need not be pretreated with a lubricating medium such as wax.

In a specific embodiment of the present invention, two separate motors are provided, with each motor being separately connected to one of the corrugating rolls. Each of the motors is provided with a speed controller. In another embodiment of the present invention, a single motor is utilized so that the motor separately drives each roll.

It is an object of the present invention to provide a novel single facer drive as disclosed herein for attaining the advantages described herein.

It is an object of the present invention to provide a drive for a single facer machine having means for corrugating low tensile strength mediums.

It is another object of the present invention to provide a single facer machine which may be operated at ambient temperatures thereby saving energy.

For the purpose of illustrating the invention, there is shown in the drawings a form which is presently preferred; it being understood, however, that the invention is not limited to the precise arrangements and instrumentalities shown.

Referring to the drawings in detail, wherein like numerals indicate like elements, there is shown in FIG. 1 apparatus in accordance with the present invention designated generally as 10.

Figure 1:
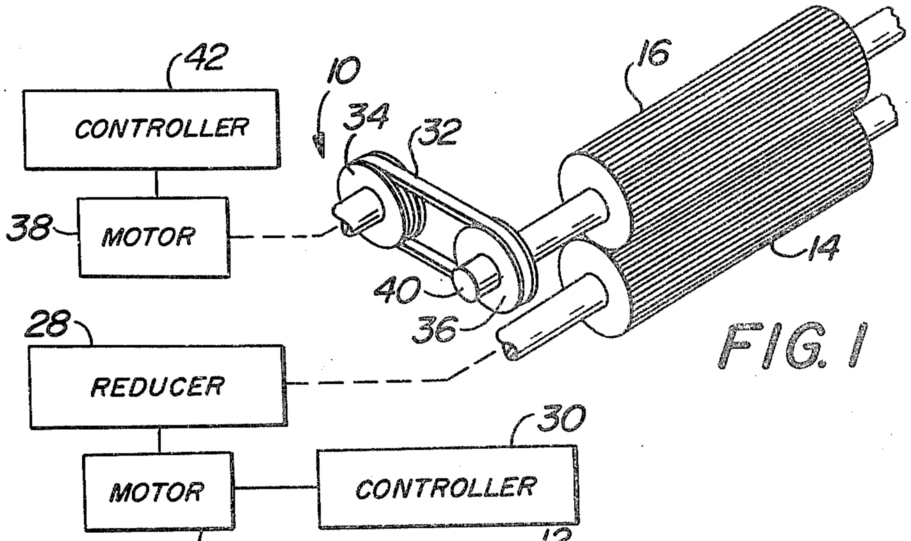
FIG. 1 is a diagrammatic view of a single facer machine in accordance with the present invention.
Figure 2:
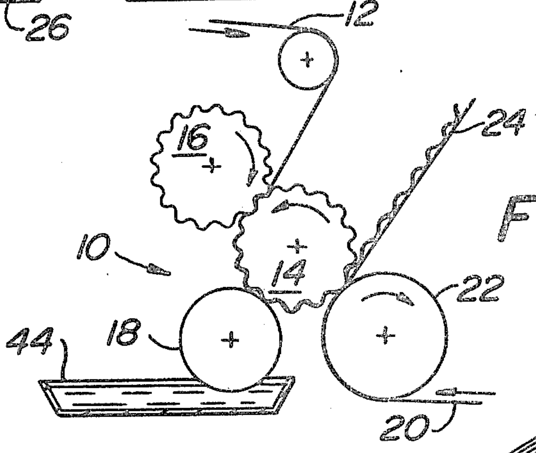
FIG. 2 is a diagrammatic cross-sectional view of a single facer machine in accordance with the present invention.

The apparatus 10 as illustrated only constitutes the elements operatively associated with the present invention. All other components of the single facer machine 10 are conventional and need not be described herein. As shown in FIG. 2, a web of medium 12 is corrugated by its passage through the meshing flutes of upper corrugating roll 16 and lower corrugating roll 14. Adhesive from a pan 44 is applied to the exposed crests of the corrugated medium 12 while the latter is on the lower corrugating roll 14 by way of an applicator roll 18. A liner 20 extends partially around the pressure roll 22 and is bonded to the crests of the flutes on web 12 to form a web of a single faced corrugated paperboard 24.

A motor 26 drives the lower corrugating roll 14 by way of the speed reducer 28. The corrugating roll 14 is driven at a selectable variable speed by a conventional motor controller 30 coupled to the motor 26. The upper corrugating roll 16 is driven in an opposite direction by motor 38 connected thereto by way of sheave 34, belt 32 and sheave 36. Sheave 36 is on shaft 40 of corrugating roll 16. Sheave 34 is on the output shaft of motor 38. Belt 32 extends around the sheaves 34, 36.

Motor 38 may be an adjustable speed electrical motor or hydraulic motor. Motor 38 is preferably a helper motor such as an AC tension control motor manufactured by Welco Industries. Such AC tension control motor delivers constant torque between stall and approximately two-thirds of its synchronous speed. The speed of motor 38 is adjustably controlled by a controller 42 such as a Welctrol II solid state controller manufactured by Welco Industries.

The driving force from motor 38 to the corrugating roll 16 is transmitted through the flexible belt 32. Belt 32 accommodates the arrangement whereby corrugating roll 16 is mounted for pivotable movement. Conventionally, the upper corrugating roll is resiliently loaded to accommodate different thicknesses of corrugating medium and to avoid damage to the rolls should an accidental wrap-up of paper around either roll occur.

With each of the corrugating rolls 14 and 16 being separately driven, little or no driving torque is transmitted through the web 12 from one corrugating roll to another whereby web 12 is corrugated with minimal tension. Since the flutes of the rolls 14, 16 are in mesh, synchronization of motors 26 and 38 need not be precise.

Under some conditions, there are advantages to drive the upper corrugating roll 16 at a speed which is between 90 and 100% of the speed of corrugating roll 14. Thus, more uniform contact between the flutes of the corrugating rolls 14 and 16 may be attained by driving the upper corrugating roll 16 at a speed which is 1 to 10% slower than the speed of roll 14.

Figure 3:
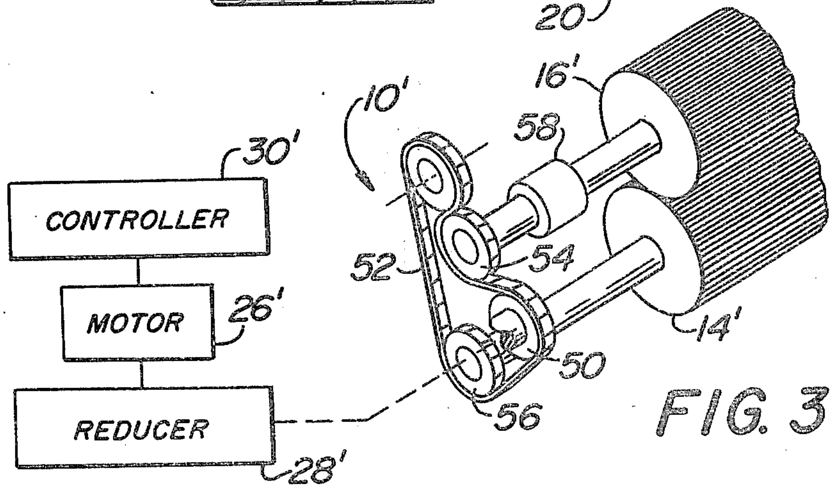
FIG. 3 is a diagrammatic illustration of another embodiment of the present invention.

In FIG. 3, there is illustrated another embodiment of the present invention designated generally as 10'. The apparatus 10' is the same as the apparatus 10 except as will be made clear hereinafter. Accordingly, corresponding elements are provided with corresponding primed numerals.

In the single facer machine 10', a single motor 26' drives the upper and lower corrugating rolls 16' and 14', respectively. However, the motor 26' is independently connected to each of the rolls 14' and 16'.

The output of motor 26' which is preferably an electrical motor controlled by the controller 30' is connected to a speed reducer 28'. The output from reducer 28' includes a sprocket 50 meshed with a chain 52. Instead of a sprocket and chain arrangement, a timing belt or other belt may be utilized. Belt 52 extends around sprockets 54 and 56. Sprockets 50 and 56 are of the same size. Sprocket 54 is smaller than sprocket 50 whereby sprocket 54 is driven at a speed such as 120% of the speed of sprocket 56. The sprocket 54 is connected to the shaft for upper corrugating roll 16' which is provided with a clutch 58. Clutch 58 may be a slip clutch which will slip at a speed corresponding to the speed of sprocket 56. Clutch 58 may be an electromagnetic clutch which is selectively adjustable and operable by the operator. Chain 52 facilitates adjustment of the upper corrugating roll 16' in the event of a wrap-up or the like.

In use, the machine operator manually sets the controller 42 to the desired output speed. The motor 38 then produces a constant torque throughout the preset speed range for independently driving the upper corrugating roll 16. In connection with the embodiment in FIG. 3, the operator may set or adjust the clutch 58 to the desired amount of slippage. In each embodiment of the invention, the upper corrugating roll 16 has a constant torque input.

The present invention may be utilized with the presently conventional heated corrugating rolls and also may be utilized with the so-called cold corrugator wherein the corrugating rolls are at room temperature. In the cold corrugator, the present invention eliminates the need for pretreating the web with a lubricating medium such as wax. In either corrugator, the present invention minimizes the tension on the web. In each corrugator, the adhesive in pan 44 is preferably a starch adhesive maintained at a temperature within about 2° F. from its gelatinization temperature. For a more complete disclosure on how to maintain the starch adhesive within about 2° of its gelatinization temperature, see U.S. Pat. No. 3,827,395 which is incorporated herein by reference.

The present invention may be embodied in other specific forms without departing from the spirit or essential attributes thereof and, accordingly, reference should be made to the appended claims, rather than to the foregoing specification as indicating the scope of the invention.

I claim:

1. In a single facer machine for producing an endless web of single faced paperboard having transverse crests comprising first and second corrugating rolls having longitudinally extending flutes in mesh, the improvement comprising motor means independently connected to each roll for separately rotating said rolls in opposite directions at substantially the same speed and without gearing said rolls directly together so that said rolls may corrugate a web passing therebetween with minimal tension on the web.

2. A single facer machine in accordance with claim 1 wherein said first roll is driven by an electric motor and said second roll is driven by a hydraulic motor.

3. A single facer machine in accordance with claim 1 wherein said motor means comprises separate discrete variable speed electric motors with each motor being connected to one of said rolls in a manner which facilitates movement of the upper corrugating roll toward and away from the lower corrugating roll.

4. A single facer machine in accordance with claim 1 wherein said motor means is a single electrical motor having its output separately connected to each corrugating roll, and a clutch between said motor and said upper corrugating roll to control slip in the driving force imparted to the upper corrugating roll by said motor.

5. Apparatus for use in connection with the manufacture of single face corrugated paperboard combined from two webs of paperboard in a single facer machine comprising a first fluted corrugating roll, a second fluted corrugating roll, said second roll having its flutes meshing with the flutes of said first corrugating roll for corrugating a medium as the rolls are rotatably driven in opposite directions, first drive means coupled to said first corrugating roll, second drive means coupled to said second corrugating roll, said second drive means having a substantially constant torque output, and speed control means coupled to said second drive means.

6. A method of improving the quality of single face corrugated paperboard combined in a single facer machine from a web of medium and a web of linerboard comprising the steps of feeding a web of corrugating medium into the nip of first and second rotatably supported corrugating rolls having meshing flutes, rotatably driving the first roll at selectable variable speed by a discrete driving means, rotatably driving the second roll at a speed which is substantially the same as the speed of the first corrugating roll by a second discrete driving means, applying adhesive to the tips of the exposed crests of the corrugated medium while it is retained in the flutes of the first corrugating roll, feeding a web of linerboard on a path juxtaposed to said exposed crests containing adhesive, pressing the web of linerboard to said exposed crests containing adhesive, and thereby producing a web of single faced corrugated paperboard.

7. A method in accordance with claim 6 including maintaining the torque applied to the second corrugating roll substantially constant throughout the speed range of the first corrugating roll.

8. A method in accordance with claim 6 including applying the adhesive at a temperature of approximately 2° F. within the gelatinization temperature of a starch mixture.

9. A method in accordance with claim 6 including using unheated corrugating rolls, and using said medium which is free from any lubricating material thereon such as wax.

* * * * *